United States Patent
Bok

(10) Patent No.: US 9,851,855 B2
(45) Date of Patent: Dec. 26, 2017

(54) TOUCH SCREEN PANEL INCLUDING TOUCH SENSOR

(71) Applicant: Samsung Display Co., Ltd., Yongin-si (KR)

(72) Inventor: Seung-Lyong Bok, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 86 days.

(21) Appl. No.: 14/886,575

(22) Filed: Oct. 19, 2015

(65) Prior Publication Data

US 2016/0195984 A1 Jul. 7, 2016

(30) Foreign Application Priority Data

Jan. 7, 2015 (KR) .......................... 10-2015-0001988

(51) Int. Cl.
*G06F 3/046* (2006.01)
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04103* (2013.01); *G06F 2203/04111* (2013.01)

(58) Field of Classification Search
CPC ................. G06F 3/044; G06F 3/0412; G06F 2203/04103; G06F 2203/04111
USPC ................. 345/156–184; 178/18.04; 349/12; 359/68
See application file for complete search history.

(56) References Cited

U.S. PATENT DOCUMENTS

| 6,163,313 A * | 12/2000 | Aroyan ................... G06F 3/045 178/18.04 |
| 8,289,296 B2 | 10/2012 | Jeong et al. |
| 8,358,284 B2 | 1/2013 | Jeong et al. |
| 9,110,546 B2 | 8/2015 | Kim et al. |
| 2010/0214247 A1 | 8/2010 | Tang et al. |
| 2010/0277433 A1 | 11/2010 | Lee et al. |
| 2011/0096388 A1* | 4/2011 | Agrawal ............... G02F 1/1506 359/268 |
| 2011/0134055 A1* | 6/2011 | Jung ...................... G06F 3/044 345/173 |
| 2011/0199333 A1* | 8/2011 | Philipp ................... G06F 3/044 345/174 |

(Continued)

FOREIGN PATENT DOCUMENTS

KR 1020070112750 11/2007
KR 1020120035744 4/2012

(Continued)

*Primary Examiner* — Prabodh M Dharia
(74) *Attorney, Agent, or Firm* — H.C. Park & Associates, PLC

(57) ABSTRACT

A touch screen panel including a substrate, first sensor electrodes disposed on the substrate, extending in a first direction, and electrically connected to each other, second sensor electrodes disposed on the substrate, extending in a second direction intersecting the first direction, and electrically connected to each other, bridge electrodes electrically connecting the first sensor electrodes in the first direction, and at least one sensor channel electrically connected to selected first and second sensor electrodes, wherein the sensor channel is electrically connected to an external driving unit through one side of the touch screen panel.

17 Claims, 10 Drawing Sheets

(56) References Cited

U.S. PATENT DOCUMENTS

| | | | | |
|---|---|---|---|---|
| 2012/0262385 A1* | 10/2012 | Kim | ........................ | G06F 3/044 |
| | | | | 345/173 |
| 2013/0009905 A1* | 1/2013 | Castillo | .................. | G06F 3/044 |
| | | | | 345/174 |
| 2013/0341651 A1* | 12/2013 | Kim | .................... | H01L 31/0232 |
| | | | | 257/84 |
| 2014/0184940 A1* | 7/2014 | Ma | ...................... | G02F 1/13338 |
| | | | | 349/12 |
| 2014/0210784 A1* | 7/2014 | Gourevitch | .......... | H03K 17/962 |
| | | | | 345/174 |
| 2014/0307177 A1* | 10/2014 | Burberry | ................. | G06F 3/044 |
| | | | | 349/12 |
| 2015/0234425 A1* | 8/2015 | Kim | ........................ | G06F 1/16 |
| | | | | 345/174 |
| 2016/0081183 A1* | 3/2016 | Ha | ...................... | H05K 1/0274 |
| | | | | 345/174 |

FOREIGN PATENT DOCUMENTS

| | | |
|---|---|---|
| KR | 1020130143334 | 12/2013 |
| KR | 1020140100091 | 8/2014 |

* cited by examiner

TOUCH SCREEN PANEL INCLUDING TOUCH SENSOR

CROSS-REFERENCE TO RELATED APPLICATION

This application claims priority from and the benefit of Korean Patent Application No. 10-2015-0001988, filed on Jan. 7, 2015, which is hereby incorporated by reference for all purposes as if fully set forth herein.

BACKGROUND

Field

Exemplary embodiments relate to a touch screen panel including a touch sensor.

Discussion of the Background

A touch screen panel is an input apparatus that may input a user's command when the user utilizes their hand or an object such as a stylus. Such a command may include, for example, selecting instructions shown on a screen such as an image display device.

To this end, the touch screen panel is typically provided on a front face of the image display device and converts a contact position, such as a position directly contacting the person's hand or the object, into an electric signal. As a result, the instructions selected at the contact position are received as an input signal.

Since such a touch screen panel may replace a separate input device connected to the image display device, such as a keyboard and mouse, touch screen panels may have uses that cannot be achieved using separate input devices.

Typical touch screen panel types include a resistive type, a photo-sensitive type, and a capacitive type. The capacitive type touch screen panel senses a change in capacitance generated by a conductive sensing electrode together with other neighboring sensing electrodes when the person's hand or the object contacts the touch screen panel to convert the contact position into the electric signal. The above information disclosed in this Background section is only for enhancement of understanding of the background of the invention and therefore it may contain information that does not form the prior art that is already known in this country to a person of ordinary skill in the art.

SUMMARY

Exemplary embodiments provide a touch screen panel having reduced bezel size at both sides of the touch screen panel.

Additional features of the invention will be set forth in the description which follows, and in part will be apparent from the description, or may be learned by practice of the invention.

An exemplary embodiment discloses a touch screen panel including a substrate, first sensor electrodes disposed on the substrate, extending in a first direction, and electrically connected to each other, second sensor electrodes disposed on the substrate, extending in a second direction intersecting the first direction, and electrically connected to each other, bridge electrodes electrically connecting the first sensor electrodes in the first direction, and at least one sensor channel electrically connected to selected first and second sensor electrodes, wherein the sensor channel is electrically connected to an external driving unit through one side of the touch screen panel.

A method for manufacturing a touch screen panel including forming sensor channels on a substrate, forming bridge electrodes on the substrate, forming an insulating layer on the sensor channels and the bridge electrodes, forming contact holes in the insulating layer to expose both ends of the bridge electrodes, and forming a sensor electrode layer including first sensor electrodes connected to each other in a first direction and second sensor electrodes connected to each other in a second direction intersecting the first direction. The sensor channels are connected to an external driving unit through one side of the touch screen panel. Both ends of the bridge electrodes are connected to the first sensor electrodes through the contact holes.

A method for manufacturing a touch screen panel including forming a sensor electrode layer on a substrate, the sensor electrode layer including first sensor electrodes electrically connected to each other in a first direction and second sensor electrodes electrically connected to each other in a second direction, the second direction being substantially orthogonal to the first direction, forming an insulating layer on the sensor electrode layer, forming contact holes in the insulating layer to expose the first sensor electrodes, forming bridge electrodes on the insulating layer such that both ends of the bridge electrodes are formed in the contact holes to electrically connect to the first sensor electrodes, and forming sensor channels on a substrate. The sensor channels are electrically connected to an external driving unit at one side of the touch screen panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
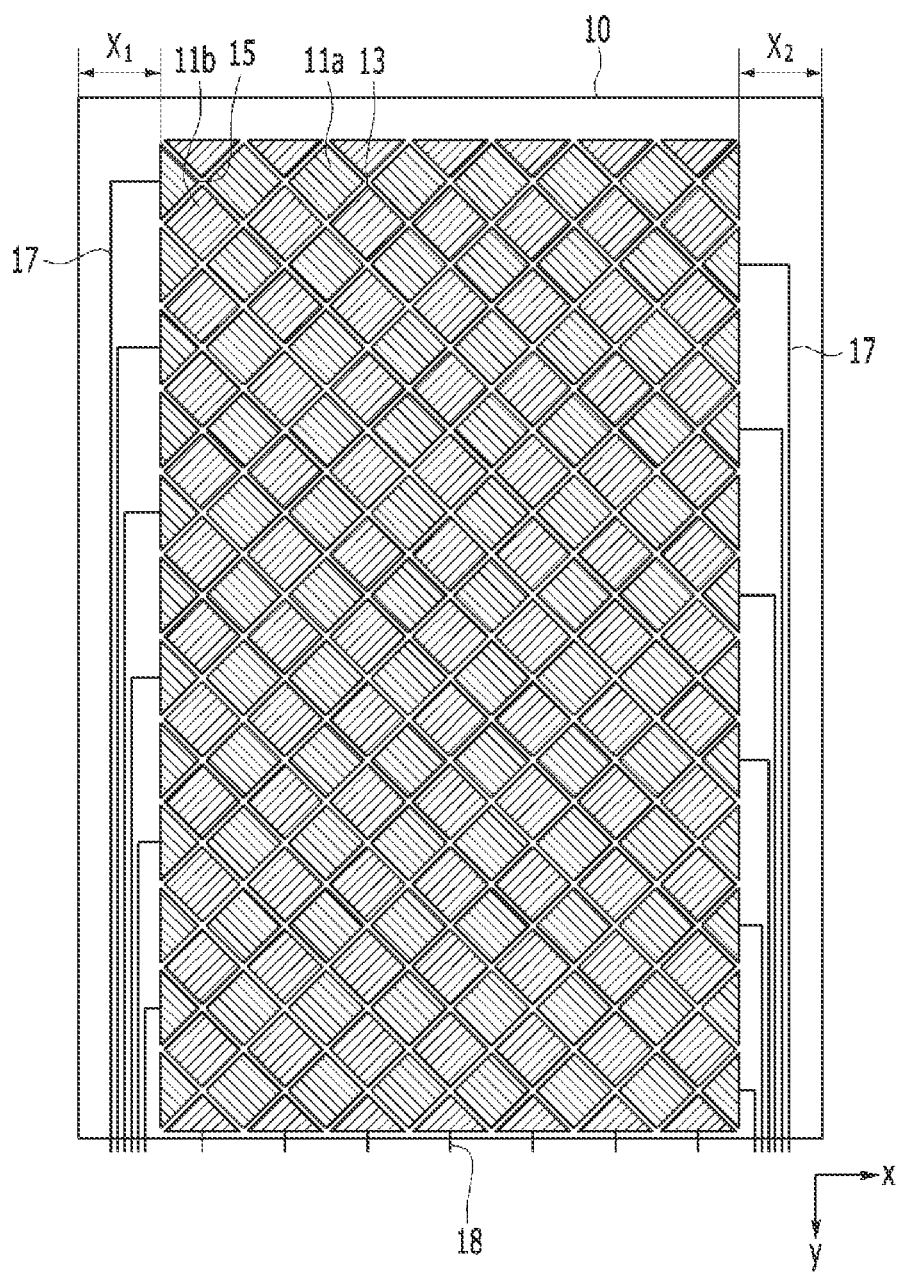
FIG. 1 is a plan view illustrating a touch screen panel including a touch sensor according to a comparative example.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

FIG. 1 is a diagram illustrating a touch screen panel according to a comparative embodiment.

Referring to FIG. 1, a touch screen panel 10 in a comparative embodiment includes a plurality of first sensor electrodes 11a and a plurality of second sensor electrodes 11b. The plurality of first sensor electrodes 11a includes X-axis directional sensor electrodes which are arranged in an X-axis direction and connection wires 13 connecting the X-axis directional sensor electrodes. The plurality of second sensor electrodes 11b includes Y-axis directional sensor electrodes and connection wires 15 connecting the Y-axis directional sensor electrodes.

The plurality of first sensor electrodes 11a may be connected to an external device, such as a touch screen panel controller, through first driving wires 17. The plurality of second sensor electrodes 11b may be connected to an external device through a plurality of second driving wires 18. In this case, as illustrated in FIG. 1, due to the plurality of first driving wires 17 connected to the plurality of first sensor electrodes 11 a, bezel regions $X_1$ and $X_2$ exist at both sides of the touch screen panel 10. As a result, the size of the touch screen panel 10 is increased by the width of the bezel regions $X_1$ and $X_2$.

Figure 2:
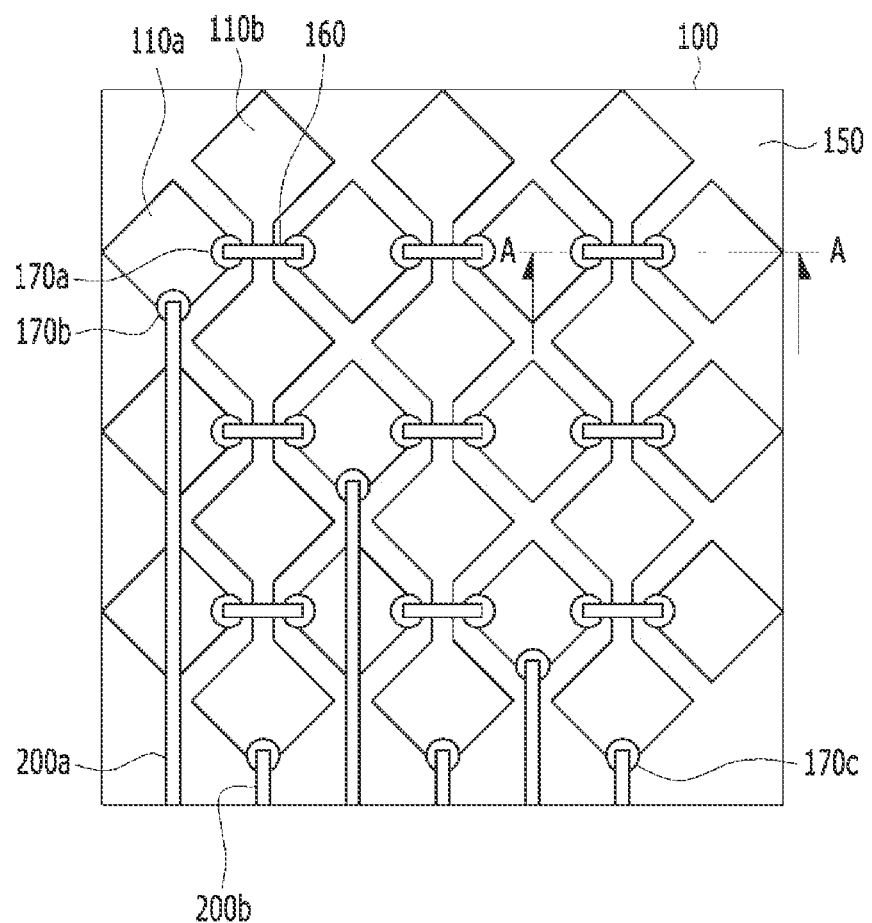
FIGS. 2, 3, and 4 are plan views illustrating a wire electrode for the touch screen panel according to exemplary embodiments.
Figure 3:
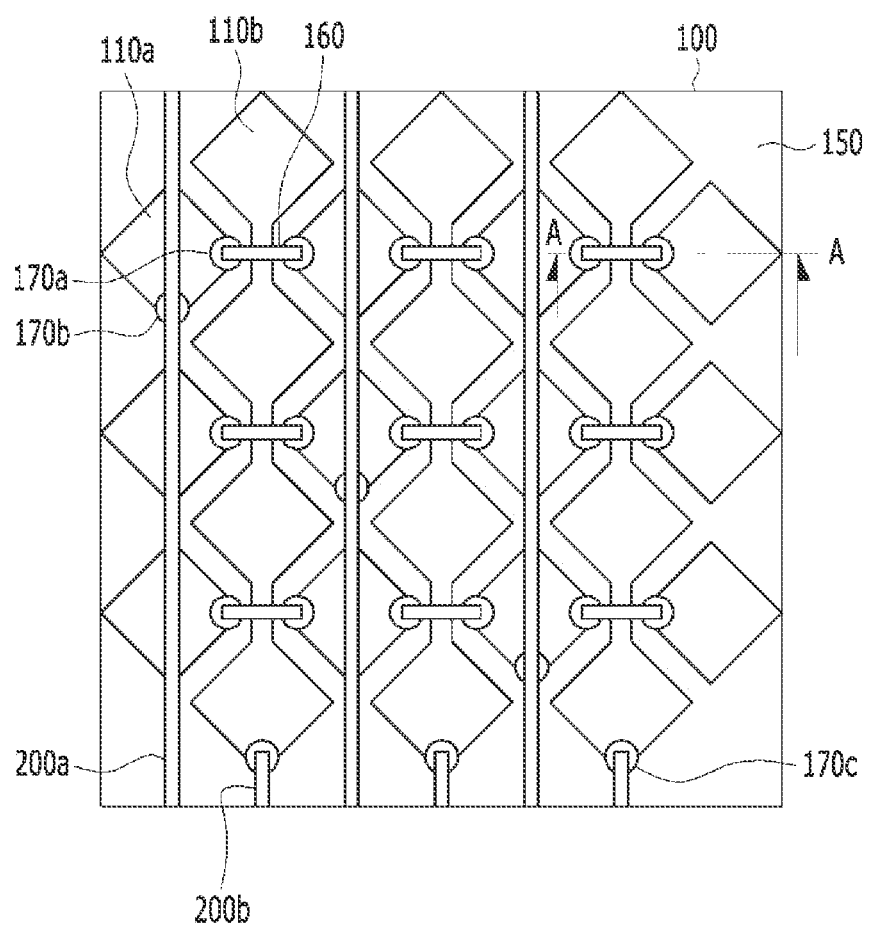
Figure 4:
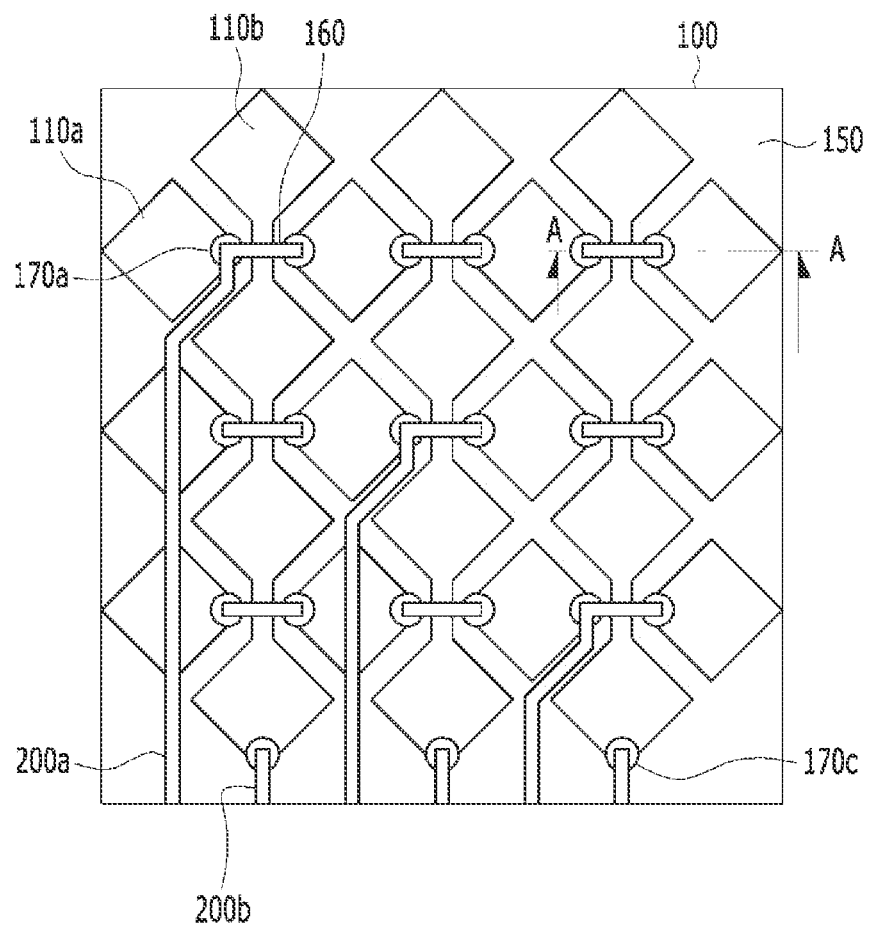
Figure 5:
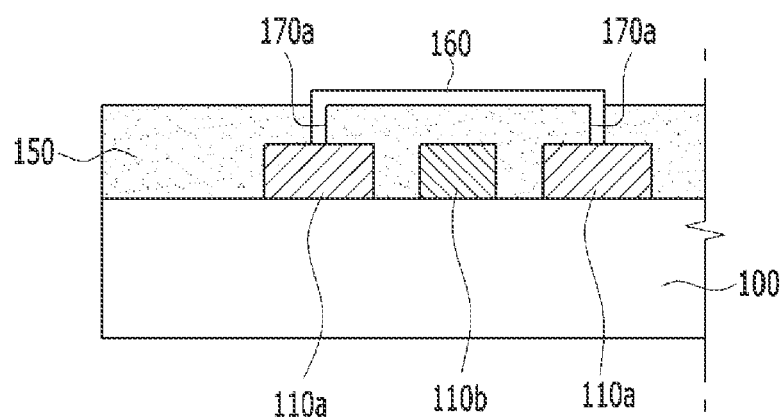
FIG. 5 is a cross-sectional view of the touch screen panel of FIGS. 2, 3, and 4 taken along line A-A.

FIGS. 2 to 4 are plan views illustrating a wire electrode for a touch screen panel according to an exemplary embodiment of the present invention, and FIG. 5 is a cross-sectional view schematically illustrating a structure of the touch screen panel illustrated in FIGS. 2 to 4, which illustrates an example of a cross-sectional view of FIGS. 2 to 4 taken along line A-A.

Referring to FIG. 2, a touch screen panel 10 according to the exemplary embodiment includes a touch sensor which may sense a contact of an external object such as a hand or a pen. The touch sensor may be formed on an outer surface of the display panel (on-cell type), but may also be formed in the display panel (in-cell type). However, exemplary embodiments are not limited thereto. For example, the touch sensor may be formed on a separate panel that is affixed on the surface of a display panel, such as that of an organic light emitting diode display, a liquid crystal display, and the like (i.e., an add-on type).

In this specification, a display panel with a touch sensor, a separate panel with the touch sensor, and the like are commonly referred to as "a touch screen panel." Hereinafter, the touch screen panel according to an exemplary embodiment will be described in detail by reference to an on-cell type touch screen panel in which the touch sensor is formed on the outer surface of the substrate of the display panel of an organic light emitting diode display. However, the type of touch screen panel or the kind of display device is not limited thereto.

Referring to FIG. 2, a touch screen panel system includes a touch screen panel 10 and a touch screen panel controller (not shown).

The touch screen panel 10 may include sensor electrodes 110a and 110b including transparent conductive layers and conductive sensor channels 200. The sensor electrodes 110a and 110b and the conductive sensor channels 200 may be formed on a substrate 100.

The substrate 100 of the touch screen panel 10 may include a material that is transparent and has high heat resistance and chemical resistance. For example, the substrate 100 may be a thin film which is formed of one or more of polyethylene terephthalate (PET), polycarbonate (PC), acryl, polymethyl methacrylate (PMMA), triacetyl cellulose (TAC), polyethersulfone (PES), and polyimide (PI).

The sensor electrodes 110a and 110b may be formed by sputtering or depositing indium tin oxide (ITO), indium zinc oxide (IZO), zinc oxide (ZnO), or the like on the sensor substrate 10. A plurality of sensor channels 200a and 200b may be formed by printing conductive ink using a silk screen printing method, but is not limited thereto.

The plurality of sensor electrodes 110a and 110b includes a plurality of first sensor electrodes 110a and a plurality of second sensor electrodes 110b which extend in directions intersecting each other. In detail, the first sensor electrodes 110a and the second sensor electrodes 110b may extend in directions substantially orthogonal to each other. As shown in FIG. 2, the first sensor electrodes 110a extend in a row direction to form an electrode row, and the second sensor electrodes 110b are arranged in a column direction to form an electrode column. As shown in FIG. 2, the first sensor electrodes 110a may have rhombus shapes that are spaced apart from each other at regular intervals. The second sensor electrodes 110b may have rhombus shapes that are connected to each other, but the forms of the first sensor electrodes 110a and second sensor electrodes 110b may be variously modified. The first sensor electrodes 110a extend in the row direction and the second sensor electrodes 110b extend in the column direction. However, in some exemplary embodiments, the first sensor electrodes 110a and the second sensor electrodes 110b may also be extended in opposite directions to each other.

The plurality of sensor channels 200a and 200b may include a first sensor channel 200a that may connect the first sensor electrodes 110a to an external driving unit and a second sensor channel 200b that may connect the second sensor electrodes 110b to the external driving unit. In detail, the first sensor channel 200a connects the first sensor electrodes 110a in a second direction and the second sensor channel 200b connects the second sensor electrodes 110b in the second direction. That is, the plurality of sensor channels 200a and 200b of the touch screen panel according to the exemplary embodiment may be disposed to be parallel to each other in the same direction.

As a result, the first sensor channel 200a and the second sensor channel 200b may be connected with the external driving unit through one side of the touch screen panel 10, and the bezel regions which exist at both sides of the touch screen panel in the comparative embodiment shown in FIG. 1 may be reduced.

The first sensor channel 200a may be formed between the first sensor electrodes 110a and the second sensor electrodes 110b to minimize a length of the first sensor channel 200a formed on the first sensor electrodes 110a.

Insulating layer 150 for electrically insulating the first sensor electrodes 110a and the second sensor electrodes 110b may be provided on the first sensor electrodes 110a and second sensor electrodes 110b. The insulating layer 150 is interposed between the first sensor electrodes 110a and the second sensor electrodes 110b, as illustrated in FIG. 5, and formed below a bridge electrode 160 (described below).

The touch screen panel 10 according to the exemplary embodiment includes bridge electrodes 160 formed across the top of the second sensor electrodes 110b in a direction intersecting the second direction. In detail, the bridge electrodes 160 are formed at both sides of the first sensor electrodes 110a and contact the first sensor electrodes 110a which are separately arranged, respectively, to electrically connect the first sensor electrodes 110a through contact holes 170. The bridge electrodes 160 are connected to the first sensor channel 200a and connect the first sensor electrodes 110a with the external driving unit.

The bridge electrodes 160 may include a material having electric conductivity, such as indium tin oxide (ITO), indium zinc oxide (IZO), zinc oxide (ZnO), and carbon nano tubes (CNT), but is not limited thereto.

The contact holes 170 include first contact holes 170a formed on the first sensor electrodes 110a to electrically connect the plurality of first sensor electrodes 110a, second contact holes 170b formed in the first sensor electrodes 110a to connect the first sensor electrodes 110a with the external driving circuit, and third contact holes 170c formed on the second sensor electrodes 110b to connect the second sensor electrodes 110b with the external driving circuit. The first contact hole 170a and the second contact hole 170b may be formed on the same first sensor electrode 110a.

FIG. 3 is a plan views illustrating a wire electrode for a touch screen panel according to an exemplary embodiment.

As illustrated in FIG. 3, the first sensor channels 200a may be formed on an active region of the touch screen panel with the same length. That is, the lengths of the first sensor channel 200a and the second sensor channel 200b which extend in the second direction are the same as each other to uniformly form the patterns. Visibility of the touch screen panel may be thereby improved by increasing the uniformity of the patterns.

FIG. 4 is a plan view illustrating a wire electrode for a touch screen panel according to another exemplary embodiment.

As illustrated in FIG. 4, in the wire electrode for the touch screen panel according to the exemplary embodiment, the first sensor channel 200a may share the bridge electrode 160 and the first contact holes 170, without forming the second contact holes 170b. As a result, the first sensor channel 200a may be connected with the external driving unit through one side of the touch screen panel without forming an additional second contact hole 170b.

In this case, the first sensor channel 200a is formed between the first sensor electrodes 110a and the second sensor electrodes 110b to minimize a length of the first sensor channel 200a across the top of the first sensor electrodes 110a.

A wire electrode for a touch screen panel according to another exemplary embodiment will be described in detail with reference to FIGS. 6 to 8.

Figure 6:
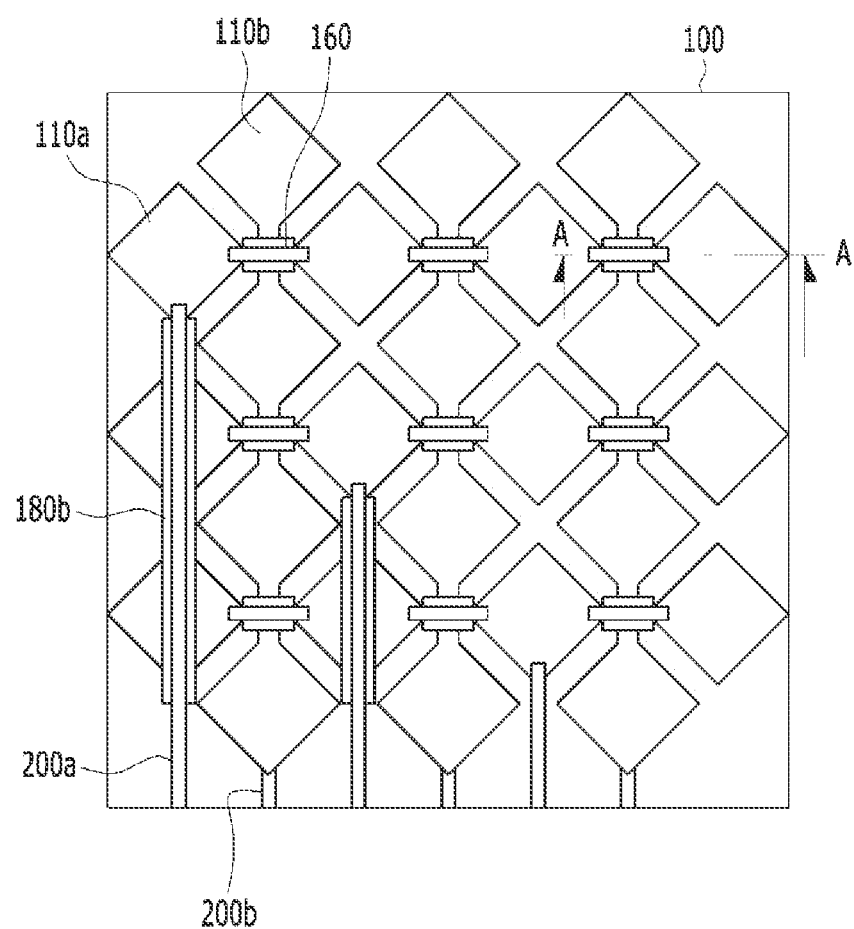
FIGS. 6 and 7 are plan views illustrating a wire electrode for a touch screen panel according to another exemplary embodiment.
Figure 7:
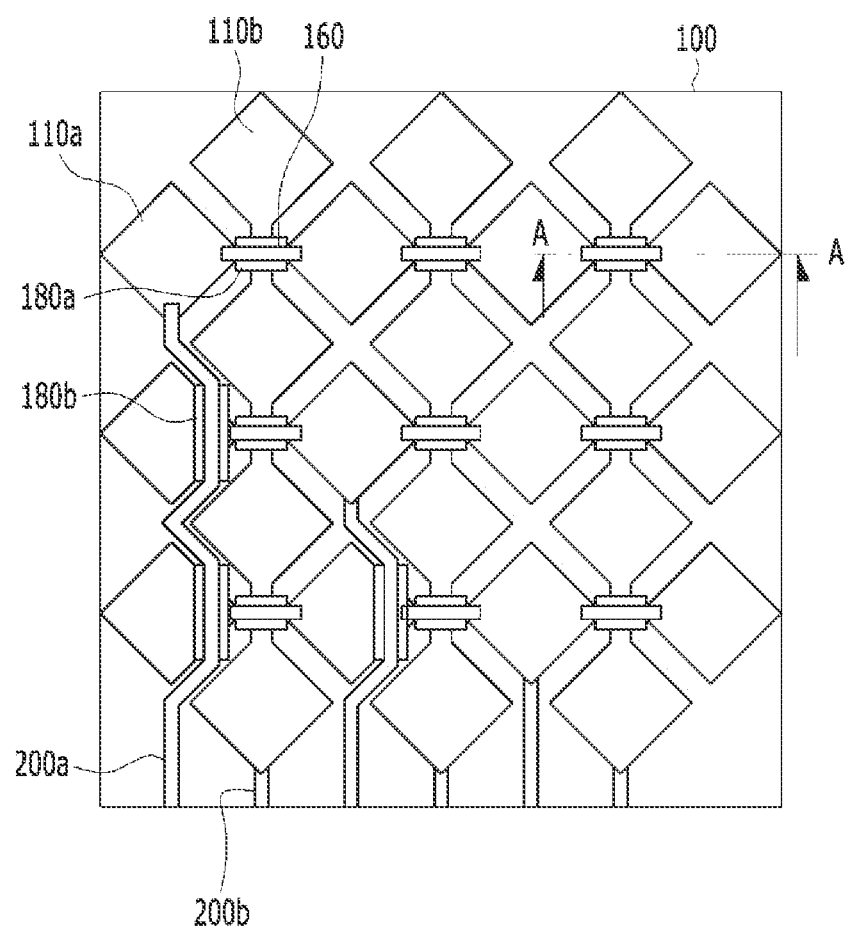
Figure 8:
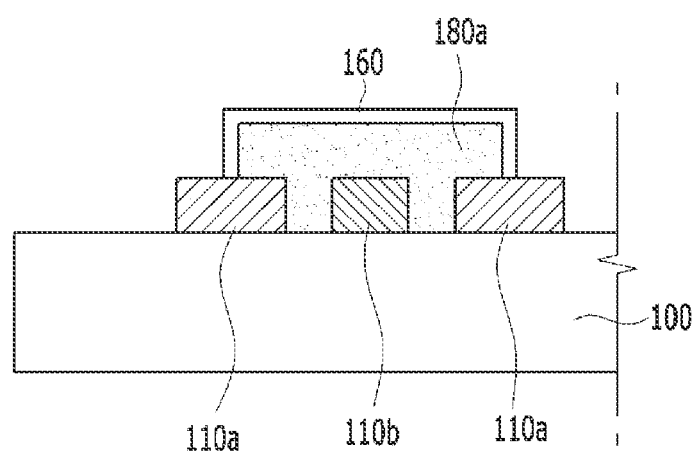
FIG. 8 is a cross-sectional view of the touch screen panel of FIGS. 6 and 7 taken along line A-A.

FIGS. 6 and 7 are plan views illustrating a wire electrode for a touch screen panel according to another exemplary embodiment, and FIG. 8 is a cross-sectional view of the touch screen panel of FIGS. 6 and 7 taken along line A-A.

As described above, the substrate 100 includes the plurality of sensor electrodes 110a and 110b and the plurality of sensor channels 200a and 200b.

The plurality of sensor electrodes 110a and 110b includes a plurality of first sensor electrodes 110a and a plurality of second sensor electrodes 110b which extend in directions intersecting each other. In detail, the first sensor electrodes 110a and the second sensor electrodes 110b may extend substantially orthogonal to each other. As shown in FIG. 6, the first sensor electrodes 110a extend in a row direction to form an electrode row and the second sensor electrodes 110b extend in a column direction to form an electrode column.

The plurality of sensor channels 200a and 200b may include a first sensor channel 200a that may connect the first sensor electrodes 110a with an external driving unit and a second sensor channel 200b that may connect the second sensor electrodes 110b with the external driving unit. In detail, the first sensor channel 200a connects the first sensor electrodes 110a in a second direction and the second sensor channel 200b connects the second sensor electrodes 110b in the second direction. That is, the plurality of sensor channels 200a and 200b of the touch screen panel according to the exemplary embodiment may be disposed to be parallel to each other in the same direction.

As a result, the first sensor channel 200a and the second sensor channel 200b may be connected with the external driving unit through one side of the touch screen panel 10, and the bezel regions which exist at both sides of the touch screen panel in the comparative embodiment shown in FIG. 1 may be reduced.

Insulating layers 180 for electrically insulating the first sensor electrodes 110a and the second sensor electrodes 110b may be provided on the first sensor electrodes 110a and second sensor electrodes 110b. Unlike the touch screen panel illustrated in FIGS. 2 to 4, the insulating layers 180 illustrated in FIGS. 6 and 7 are formed only below the bridge electrode 160 and the first sensor channel 200a.

In detail, the insulating layers 180 include a first insulating layer 180a formed only below the bridge electrode 160 and a second insulating layer 180b formed only below the first sensor channel 200a. In more detail, the insulating layers 180a and 180b are formed to be smaller than lengths of the bridge electrode 160 and the first sensor channel 200a to electrically connect the first sensor electrodes 110a to each other and electrically connect the first sensor channel 200a connected with the bridge electrode 160 with the external driving unit.

Referring to FIG. 7, the first sensor channel 200a may be formed between the first sensor electrodes 110a and the second sensor electrodes 110b. The first sensor channel 200a is formed between the first sensor electrodes 110a and the second sensor electrodes 110b to minimize the length of the first sensor channel 200a across the top of the first sensor electrodes 110a. In this case, the second insulating layer 180b is formed only on the first sensor electrode 110a in a section through which the first sensor channel 200a passes, thereby reducing costs of forming the insulating layer.

Further, as illustrated in FIGS. 6 and 8, the first sensor channel 200a and the second sensor channel 200b may be directly connected to the first sensor electrodes 110a and the second sensor electrodes 110b, without forming the contact holes. Referring to FIG. 8, the insulating layer 180 is formed only below the bridge electrode 160, and the plurality of sensor electrodes 110a and 110b and the bridge electrodes 160 directly contact each other.

Figure 9:
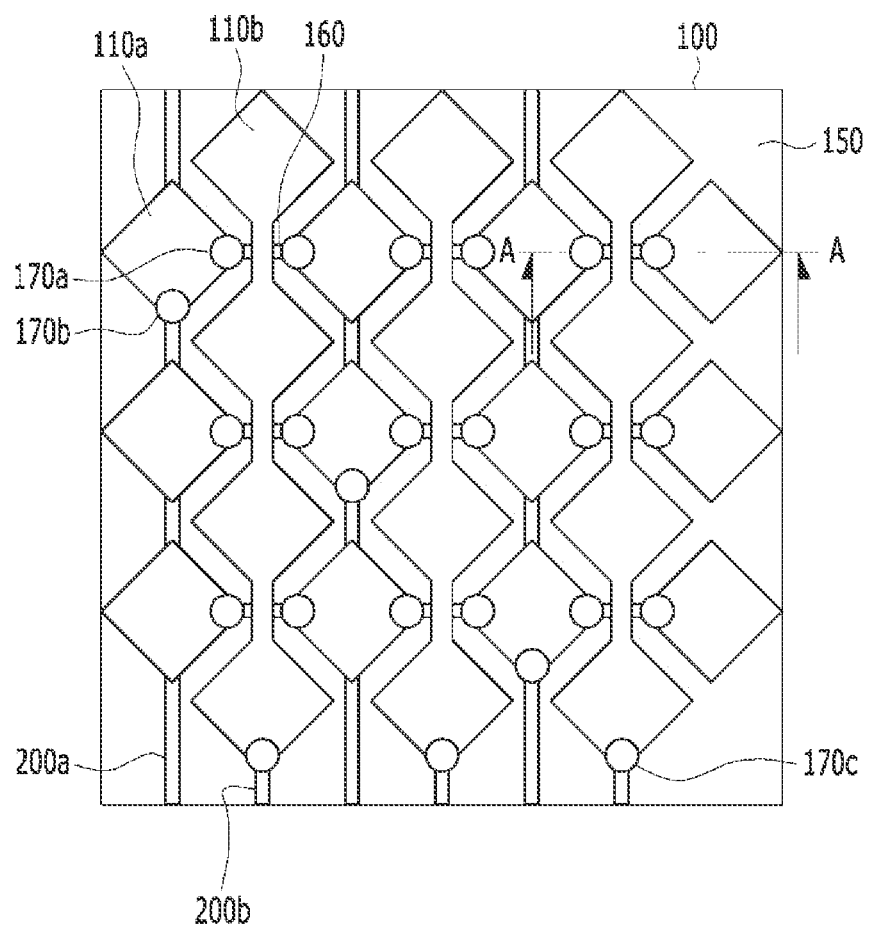
FIG. 9 is a plan view illustrating a wire electrode for a touch screen panel according to yet another exemplary embodiment.
Figure 10:
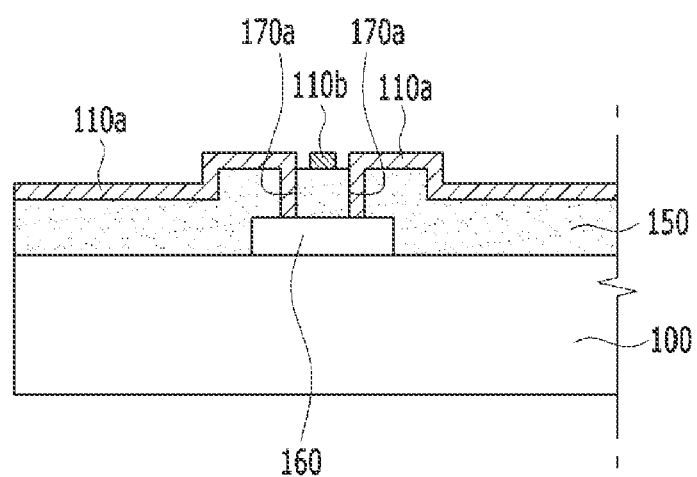
FIG. 10 is a cross-sectional view of the touch screen panel of FIG. 9 taken along line A-A.

FIG. 9 is a plan view illustrating a wire electrode for a touch screen panel according to yet another exemplary embodiment, and FIG. 10 is a cross-sectional view of the touch screen panel of FIG. 9 taken along line A-A.

In the wire electrode for the touch screen panel illustrated in FIG. 9, unlike the exemplary embodiment in which the first sensor electrodes 110a and the second sensor electrodes 110b are first formed on the substrate, the bridge electrodes 160 and/or the plurality of sensor channels 200a and 200b are first formed on the substrate. The lengths of the first sensor channel 200a and the second sensor channel 200b which are formed on the active region of the substrate are the same as each other. Further, the sensor electrodes (110a, 110b) may be connected to the external driving unit through one side of the substrate by the first sensor channel 200a and the second sensor channel 200b which are formed in the same direction, and bezel regions existing at both sides of the touch screen panel in the comparative embodiment shown in FIG. 1 may thereby be reduced.

Thereafter, an insulating layer 150 is formed on the bridge electrodes 160 and the plurality of sensor channels 200a and 200b. The insulating layer 150 is formed on the bridge electrodes 160 and the plurality of sensor channels 200a and 200b to prevent oxidation of the bridge electrodes 160 including metal.

After forming the insulating layer 150, the contact holes 170 are formed so that both ends of the bridge electrodes 160 are inserted to form the plurality of sensor electrodes 110a and 110b.

The contact holes 170 include first contact holes 170a formed on the first sensor electrodes 110a electrically connecting the plurality of first sensor electrodes 110a, second contact holes 170b formed in the first sensor electrodes 110a connecting the first sensor electrodes 110a with the external driving circuit, and third contact holes 170c formed on the second sensor electrodes 110b connecting the second sensor electrodes 110b with the external driving circuit. The first contact hole 170a and the second contact hole 170b may be formed on the same first sensor electrode 110a.

The plurality of sensor electrodes 110a and 110b includes a plurality of first sensor electrodes 110a and a plurality of second sensor electrodes 110b which extend in directions intersecting each other. In detail, the first sensor electrodes 110a and the second sensor electrodes 110b may extend orthogonally to each other. s shown in FIG. 2, the first sensor electrodes 110a extend in a row direction to form an electrode row and the second sensor electrodes 110b extend in a column direction to form an electrode column.

Referring to FIG. 10, the bridge electrodes 160 are formed on the substrate 100, and the insulating layer 150 is formed below the first sensor electrodes 110a and the second sensor electrodes 110b.

According to exemplary embodiments, it is possible to reduce bezel regions which typically exist at both sides of a touch screen panel.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:
1. A touch screen panel, comprising:
   a substrate;
   first sensor electrodes disposed on the substrate, arranged in a first direction, and electrically connected to each other;

second sensor electrodes disposed on the substrate, arranged in a second direction intersecting the first direction, and electrically connected to each other;
bridge electrodes electrically connecting the first sensor electrodes in the first direction;
first sensor channels electrically connected to selected ones of the first sensor electrodes; and
second sensor channels electrically connected to selected ones of the second sensor electrodes,
wherein at least one of the first sensor channels includes a portion disposed between two adjacent ones of the bridge electrodes in the first direction in a plan view.

2. The touch screen panel of claim 1, wherein:
the first direction is a row direction, and the first sensor electrodes are electrically connected to each other in the first direction in an electrode row; and
the second direction is a column direction substantially orthogonal to the first direction, and the second sensor electrodes are electrically connected to each other in the second direction in an electrode column.

3. The touch screen panel of claim 2, further comprising:
an insulating layer interposed between an overlapping portion of the first sensor electrodes and the second sensor electrodes.

4. The touch screen panel of claim 3, further comprising:
first contact holes disposed in the insulating layer in which both ends of the bridge electrodes are disposed.

5. The touch screen panel of claim 4, wherein:
the first sensor channels are electrically connected to the first sensor electrodes through the first contact holes; and
the first sensor channels are disposed on the insulating layer or disposed on the first sensor electrodes and the insulating layer.

6. The touch screen panel of claim 5, wherein:
the second sensor channels are disposed on the insulating layer and electrically connected to an external driving unit through third contact holes.

7. The touch screen panel of claim 4, wherein:
the first sensor channels are disposed on the insulating layer or disposed on the first sensor electrodes and the insulating layer.

8. The touch screen panel of claim 7, wherein:
the second sensor channels are disposed on the insulating layer and electrically connected to an external driving unit through second contact holes.

9. The touch screen panel of claim 8, wherein:
the first sensor channels and the second sensor channels are substantially parallel to each other and electrically connected to the external driving unit.

10. The touch screen panel of claim 9, wherein:
the first sensor channels have a same length with each other.

11. The touch screen panel of claim 2, wherein:
the first sensor channels are directly connected to the first sensor electrodes; and
the second sensor channels are directly connected to the second sensor electrodes.

12. The touch screen panel of claim 11, further comprising:
a first insulating layer disposed below the bridge electrodes and having a length smaller than a length of the bridge electrode; and
a second insulating layer disposed below the first sensor channels and having a length smaller than a length of the first sensor channel.

13. The touch screen panel of claim 1, wherein:
all of the first sensor channels and the second sensor channels are electrically connected to an external driving unit through one side of the touch screen panel; and
the first sensor channels and the second sensor channels are substantially parallel to each other and electrically connected to the external driving unit.

14. A method for manufacturing a touch screen panel, comprising:
forming first and second sensor channels on a substrate;
forming bridge electrodes on the substrate;
forming an insulating layer on the first and second sensor channels and the bridge electrodes;
forming contact holes in the insulating layer to expose both ends of the bridge electrodes; and
forming a sensor electrode layer comprising first sensor electrodes connected to each other in a first direction and second sensor electrodes connected to each other in a second direction crossing the first direction,
wherein:
the first sensor channels are electrically connected to selected ones of the first sensor electrodes;
the second sensor channels are electrically connected to selected ones of the second sensor electrodes;
at least one of the first sensor channels includes a portion disposed between two adjacent ones of the bridge electrodes in the first direction in a plan view; and
both ends of the bridge electrodes are connected to the first sensor electrodes through the contact holes.

15. The manufacturing method of claim 14, wherein:
all of the first sensor channels and the second sensor channels are electrically connected to an external driving unit through one side of the touch screen panel; and
the first and second sensor channels are substantially parallel to each other and have the same length as each other.

16. A method for manufacturing a touch screen panel, comprising:
forming a sensor electrode layer on a substrate, the sensor electrode layer comprising first sensor electrodes electrically connected to each other in a first direction and second sensor electrodes electrically connected to each other in a second direction, the second direction being substantially orthogonal to the first direction;
forming an insulating layer on the sensor electrode layer;
forming contact holes in the insulating layer to expose the first sensor electrodes;
forming bridge electrodes on the insulating layer such that both ends of the bridge electrodes are formed in the contact holes to electrically connect to the first sensor electrodes; and
forming first and second sensor channels on the substrate, wherein:
the first sensor channels are electrically connected to selected ones of the first sensor electrodes;
the second sensor channels are electrically connected to selected ones of the second sensor electrodes; and
at least one of the first sensor channels includes a portion disposed between two adjacent ones of the bridge electrodes in the first direction in a plan view.

17. The manufacturing method of claim 16, wherein:
all of the first sensor channels and the second sensor channels are electrically connected to an external driving unit through one side of the touch screen panel; and
the first and second sensor channels are substantially parallel to each other and have the same length as each other.

* * * * *